(12) United States Patent
Lin (10) Patent No.: US 6,845,434 B2
(45) Date of Patent: Jan. 18, 2005

(54) METHOD FOR UPDATING PARAMETRIC DATA FOR USE IN DATA MANAGEMENT SYSTEM

(75) Inventor: Chih-Hsien Lin, Taipei (TW)

(73) Assignee: Benq Corporation, Taoyuan (TW)

( * ) Notice: Subject to any disclaimer, the term of this patent is extended or adjusted under 35 U.S.C. 154(b) by 458 days.

(21) Appl. No.: 10/134,594

(22) Filed: Apr. 30, 2002

(65) Prior Publication Data

US 2002/0174283 A1 Nov. 21, 2002

(30) Foreign Application Priority Data

May 1, 2001 (TW) .......................... 90110444 A (51) Int. Cl.⁷ ............................................. G06F 12/16
(52) U.S. Cl. ...................................... 711/162; 711/117
(58) Field of Search .............................. 711/162, 161, 711/117; 707/204; 714/6

(56) References Cited

U.S. PATENT DOCUMENTS 6,032,137 A * 2/2000 Ballard ..................... 705/75

6,434,681 B1 * 8/2002 Armangau ................. 711/162

FOREIGN PATENT DOCUMENTS

CN 11-73669 2/1998

* cited by examiner

*Primary Examiner*—Hiep T. Nguyen
(74) *Attorney, Agent, or Firm*—Rabin & Berdo, P.C.

(57) ABSTRACT

A method for updating parametric data for use in data management system. The data management system includes a data storage device which includes a non-volatile memory device and a random access memory (RAM) device. The non-volatile memory device includes a transaction data storage device and a backup data storage device. When the requirements of a client device change, corresponding parameters stored in the RAM device can be changed and the changed parameters are written to the transaction data storage device. When the system restarts due to contingency, the contents of the backup data storage device are written to the RAM device, and then the corresponding parameters of the RAM device are updated according to the contents of the transaction data storage device. In this way, the contents of the RAM device can be restored to the parameters that was set before the system interruption.

20 Claims, 5 Drawing Sheets

METHOD FOR UPDATING PARAMETRIC DATA FOR USE IN DATA MANAGEMENT SYSTEM

This application incorporates by reference of Taiwan application Serial No. 090110444, filed on May 1, 2001.

BACKGROUND OF THE INVENTION

1. Field of the Invention

The invention relates in general to a method for updating parametric data, and more particularly to a method for updating parametric data for use in a data management system.

2. Description of the Related Art

Figure 1:
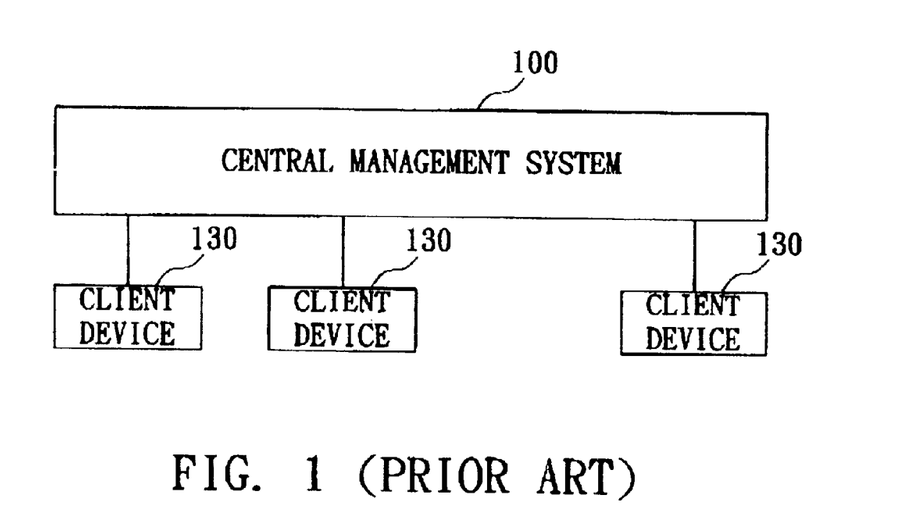
FIG. 1 (Prior Art) illustrates a network management system.

Advances in high technology have led to the widespread use of various network configurations, for example, computer networks and telecommunication networks, bringing people much more convenience in life. FIG. 1 shows a network management system. The network management system includes a central management system 100 and a number of client devices 130 connected to the central management system 100 through a network. Since the client devices 130 have different configurations and requirements, corresponding provisioning data are different. For example, a user A has his provisioning data stored in a data management system for the user A while a user B has her provisioning data stored in a data management system for the user B. Note that since the provisioning data records the parameters for configuration of a client device, when the requirements of a user change, the configuration of the client device can be altered by directly modifying the parameters in the client device. It is a convenience to configure the client device corresponding to the actual requirements of the user in this way.

Figure 2:
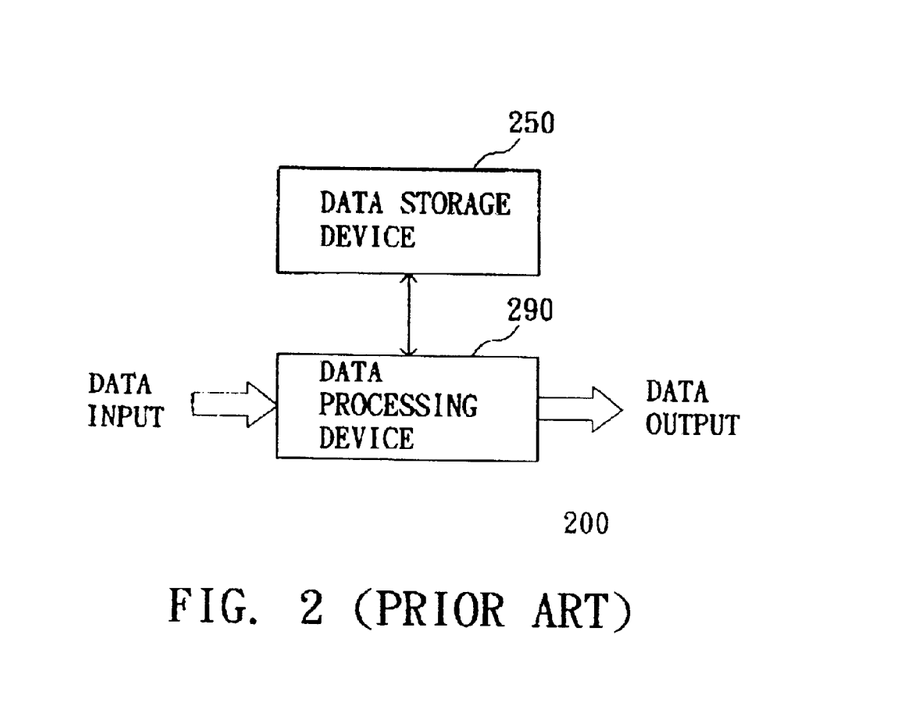
FIG. 2 (Prior Art) shows a data management system for a client device in block diagram form.

FIG. 2 is a block diagram of a data management system 200 of a client device. The data management system 200 can be an embedded system or an open system, including a data storage device 250 and a data processing device 290. The data processing device 290 can be a central processing unit (CPU) or other hardware associated with software for data processing. In general, the provisioning data of a user can be stored in the data storage device 250. When the data management system 200 is set in operation, the data storage device 250 only needs to feed the provisioning data into the data processing device 290, and then the data management system 200 configures corresponding hardware according to the provisioning data, thereby causing the system configuration to correspond to the requirements of the client device. In the following, access to the provisioning data in the data storage device 250 is illustrated.

Figure 3A:
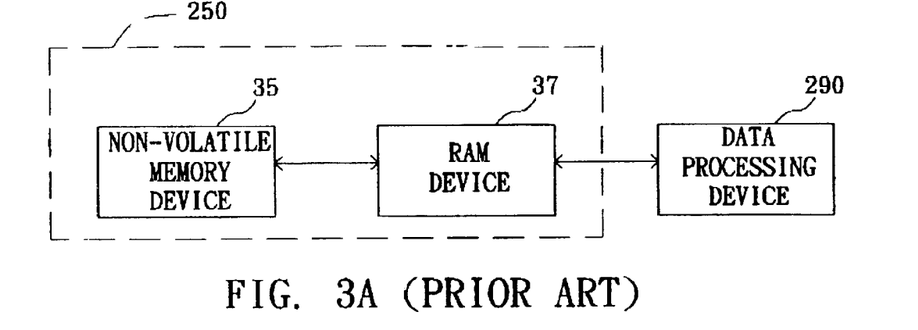
FIG. 3A (Prior Art) shows a conventional data storage device in block diagram form.

FIG. 3A shows a data storage device 250 in a block diagram. The data storage device 250 includes a non-volatile memory device 35 and a random access memory device 37. The non-volatile memory device 35 may be, for example, an erasable programmable read-only memory (EPROM), an electrically erasable programmable read-only memory (EEPROM), or a flash erasable programmable read-only memory (flash EPROM). The random access memory device 37 generally refers to a random access memory (RAM) such as static random access memory (SRAM) or dynamic random access memory (DRAM).

For the approach generally used, the provisioning data are stored in the non-volatile memory device 35 so as to prevent data loss when the system restarts. Since the write speed of the non-volatile memory device 35 is low, at system start-up, the provisioning data stored in the non-volatile memory device 35 are read and then written into the random access memory device 37, which has a faster read/write speed. Through the connection between the random access memory device 37 and the data processing device 290, system setting and changes of various parameters are performed. When the requirements of the client device are changed, the related parameters that are stored in the random access memory device 37 can be modified, corresponding to the actual requirements. Since the data stored in the random access memory device 37 would be lost as the system shuts down, the system, for every certain time period, replaces the provisioning data stored in the non-volatile memory device 35 by writing the latest version of the provisioning data stored in the random access memory device 37 to the non-volatile memory device 35 in order to maintain the effectiveness of the provisioning data stored in the non-volatile memory device 35. Such writing operation generally operates in the background without informing the user, and does not influence other in-process operations. In this way, as the system restarts, the latest version of the provisioning data read from the non-volatile memory device 35 can be written to the random access memory device 37 for use in the system configuration. In other words, as the system starts up, the non-volatile memory device 35 provides the latest version of the provisioning data in order for the system's configuration tasks to be completed.

Figure 3B:
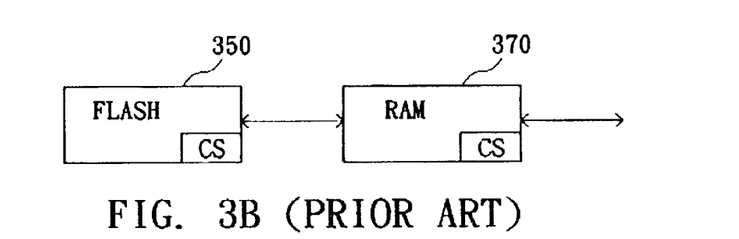
FIG. 3B (Prior Art) illustrates the data storage device in FIG. 3A in practice.

In practice, flash EPROM and RAM, as shown in FIG 3B, are used as the non-volatile memory device 35 and the random access memory device 37, respectively. It should be noted that flash EPROM 350 and RAM 370 have their respective check codes, for example, checksum (CS), for the determination of data correctness for the memory devices. As an example of checksum, a numerical value obtained by adding all data bits stored in the RAM 370 can be referred to as the checksum for the data. Normally, the checksum CS is updated after the data stored in the RAM 370 are modified, which ensures the consistency between the stored data and their checksum CS. However, the checksum CS will not be updated in some abnormal situation. For example, after the data stored in the RAM 370 are modified abnormally, the checksum CS will not be updated. In such case, the checksum CS of the RAM 370 will, then, be inconsistent with the checksum based on the data stored in the RAM 370. Once the system detects the inconsistency between the checksum CS of the RAM 370 and the checksum based on the data stored in the RAM 370, the system will overwrite the data stored in the RAM 370 with the provisioning data stored in the flash 350 so as to ensure the correctness of the contents of the RAM 370. As to the flash 350, a numerical value obtained from summation based on the data stored in the flash 350 can be referred to as a checksum CS. As mentioned above, the replacement of the provisioning data stored in the flash 350 is made gradually by the system in the background. In this way, on completion of the replacement, a checksum CS is computed, based on the data stored in the flash 350, and is used to replace the last checksum CS. Note that when the data stored in the RAM 370 are written to the flash 350, if the system is suddenly interrupted by, for example, power supply failure, system failure, or misoperation that the user carelessly presses a reset key to make the system restart, the updating process on the provisioning data will be interrupted. Since the updating process on the provisioning data in the flash 350 has not completed, the checksum CS of the flash 350 remains unchanged (unless the updating process is completed). In this case, when the system restarts, an abnormal situation that the summation based on the data stored in the flash 350 is not equal to the checksum CS stored in the flash 350 occurs. When the system detects the abnormal situation, the system reads the default values of the provisioning data from the flash 350, writes them to the RAM 37 and then configures the system according to the default values stored in the RAM 37. In this way, the configuration of the system is restored to the configuration according to the default values and the related setting is restored to the original factory setting. Accordingly, various parameters of the client device, such as IP address, have to be configured again. It makes a great inconvenience to the users. On the other hand, since the system frequently writes the latest version of the provisioning data to the non-volatile memory device, the frequency for updating the data stored in the non-volatile memory device is high, thus resulting in a reduction to the lifetime of the non-volatile memory device.

SUMMARY OF THE INVENTION

It is therefore an object of the invention to provide a method for updating parametric data. According to the invention, when abnormal situation occurs, instead of being recovered to the original factory setting, the system can be restored to its previous setting according to a latest version of configuration data.

It is another object of the invention to provide a method for updating parametric data to reduce the time for updating the data stored in the non-volatile memory device and reduce the probability of an updating process being interrupted abnormally.

The invention achieves the above-identified objects by providing a method for updating parametric data as described in the following.

A data management system of a client device includes a data storage device for storing various parameters for configuring the data management system. The data storage device includes a backup data storage device for storing provisioning data, a random access memory (RAM) device for use in dynamical provisioning data modification, and a transaction data storage device for recording variations in parameters. When the requirements of the client device are changed, the related parameters stored in the RAM device will be modified. When the modification is done in the RAM device, the data management system writes the changes to the transaction data storage device. When the data management system restarts, the system writes the data stored in the backup data storage device to the RAM device, and then updates the related parameters stored in the RAM device according to the contents of the transaction data storage device. In this way, the contents of the RAM device can correspond to the most recent requirements of the user. When the amount of content stored in the transaction data storage device has increased to a certain level, the backup data storage device will be updated according to the contents of the transaction data storage device. Once the backup data storage device is updated with the contents of the transaction data storage device, the contents of the transaction data storage device will be erased and the transaction data storage device can store subsequent variations in parameters.

In addition, the data storage device may include two backup data storage devices for storing two different versions of the provisioning data. Each of the backup data storage devices has its flag for recording a serial number indicative of version information. The flag of one of the backup data storage devices with a greater value may indicate that the one stores a newer version of the provisioning data, for example. After the contents of the RAM device are modified, the system can write the changes to the transaction data storage device. When the system restarts, the backup data storage device having the flag with a larger value is selected and the contents of the backup data storage device are written to the RAM device. Next, the parameters stored in the RAM device are updated according to the data stored in the transaction data storage device so that the contents of the RAM device can match the latest requirements of the user. When it needs to update one of the backup data storage devices, the system selects the one which has a flag with a smaller value (since the contents of the one is an older version of the provisioning data) and uses the contents of the RAM device to overwrite the contents of the backup data storage device. Once updated, the contents of the backup data storage device correspond to the latest version of the provisioning data, and its flag can be set to a larger value and the contents of the transaction data storage device can be erased for recording subsequent parameters changes.

Other objects, features, and advantages of the invention will become apparent from the following detailed description of the preferred but non-limiting embodiments. The following description is made with reference to the accompanying drawings.

DETAILED DESCRIPTION OF THE INVENTION

In the invention, a non-volatile memory device of a data storage device is configured in the structure with a transaction data storage device and a backup data storage device. The transaction data storage device is used for storing provisioning data, and the backup data storage device is used for storing changes in the provisioning data. If the user desires to modify the configuration of the system, the user may change the parameters stored in the random access memory (RAM) device. Once the parameters are changed, the system writes the changed parameters to the transaction data storage device. When the system restarts, the system firstly writes the provisioning data stored in the backup data storage device to the RAM device, and then modifies the contents of the RAM device according to the contents of the transaction data storage device. After that, the provisioning data stored in the RAM device is to be the latest version. By configuring the system according to the data stored in the RAM device in this way, the latest requirements of the client device can be satisfied. In the following, the invention is described by providing two embodiments based on the principle given above.

Embodiment I

Figure 4:
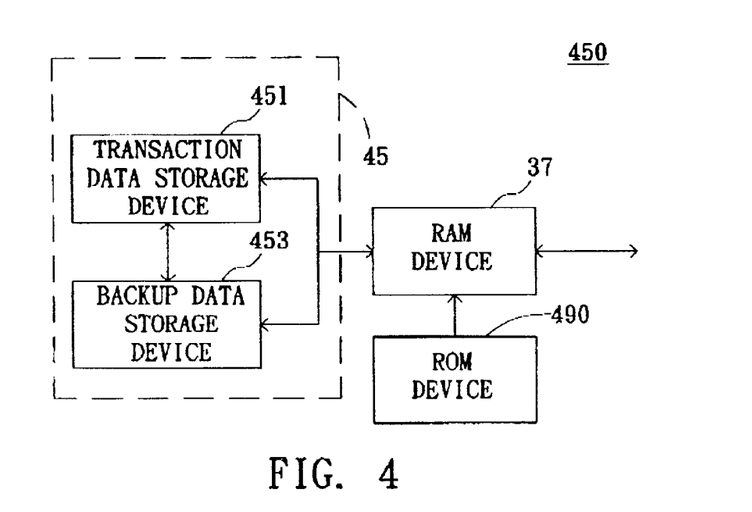
FIG. 4 is a block diagram illustrating a data storage device according to a first embodiment of the invention.

FIG. 4 shows a data storage device 450 according to a first embodiment of the invention. The data storage device 450 includes a non-volatile memory device 45, a random access memory (RAM) device 37, and a read-only memory (ROM) device 490, wherein the non-volatile memory device 45 is coupled to the RAM device 37. The non-volatile memory device 45 can be, for example, erasable programmable read only memory (EPROM), electrically erasable programmable read only memory (EEPROM), or flash erasable programmable read only memory (flash EPROM). The RAM device 37 is a random access memory (RAM) such as static random access memory (SRAM), or dynamic random access memory (DRAM). The ROM device 490 can be any read-only memory (ROM). The non-volatile memory device 45 includes a transaction data storage device 451 and a backup data storage device 453. The transaction data storage device 451 and backup data storage device 453 are non-volatile memory devices, for example, EPROM, EEPROM, or flash EPROM. The non-volatile memory device 45, in practice, can be a non-volatile memory (e.g., a flash EPROM) whose two memory areas, separated by assigning different memory addresses to them, are indicative of the transaction data storage device 451 and backup data storage device 453.

The data storage device 450 is disposed in the data management system to store various data required by the system. The data management system can be an embedded system or an open system, for example. Note that the default values for the provisioning data are stored in the ROM device 490 before the data storage device 450 left the factory, for contingent use. In a contingent case such as the system being down, the minimum requirements for setting the configuration can be meet with the default values. The ROM device 490 stores programs for configuring the system, in addition. When the data processing device 290 reads and executes such programs, it can read the parametric data for system configuration. For the sake of brevity, the default values for the provisioning data, hereinafter, are referred to as initial backup data.

When the data storage device 450 is activated for the first time, the data management system configures different parts of hardware inside the system. The data management system first executes the programs stored in the ROM device 490 and writes the initial backup data from the ROM device 490 to the RAM device 37, thus completing the hardware configuration. Next, the data management system writes the initial backup data stored in the RAM device 37 to the backup data storage device 453 so as to complete the first starting process. After the system completes start-up, if the requirements of the client device are different from the default values, the user may modify the parameters stored in the RAM device 37, according to the actual requirements. The system can record the changed parameters by writing the changed parameters stored in the RAM device 37 to the transaction data storage device 451. For a client device, for example, a first parameter was changed from M to m after the first change; a second parameter was changed from N to n after the second change; a third parameter from Q to q after the third change. After the changes, the values of these parameters are written into the transaction data storage device 451, which stores the addresses, values, and related data of the first, second, and third parameters. When the system restarts, the initial backup data stored in the backup data storage device 453 are first read and written to the RAM device 37, and then the contents of the RAM device 37 are updated according to the contents of the transaction data storage device 451. That is, the RAM device 37 finally has its first, second, and third parameters changed to m, n, and q. Thus, by updating the provisioning data stored in the RAM device 37 in this way, the actual requirements for the client device can be satisfied.

In case of system being interrupted during writing the changes stored in the RAM device 37 to the transaction data storage device 451, the transaction data storage device 451 can still keep the changes that have been written into the transaction data storage device 451 before the system interruption. For a client device, for example, a first parameter was changed from M to m after the first change; a second parameter was changed from N to n after the second change; a third parameter from Q to q after the third change. The changed parameters are to be written to the transaction data storage device 451. Suppose the system interruption occurs in the process of the third change, that is, when the parameter q is being written to the transaction data storage device 451. After such system interruption, the transaction data storage device 451 can still keep the parameters changed in the two previous changes, that is, the changed first and second parameters. When the system restarts, the initial backup data are written to the RAM device 37 and the contents of the RAM device 37 are updated according to the contents of the transaction data storage device 451, so that the RAM device 37 can still maintain the provisioning data similar to the actual requirements. Compared with the invention, the conventional approach, when such system interruption occurs, would result in the first, second, and third parameters to be set as the default values, that is, M, N, and Q, respectively.

As described above, when the parameters stored in the RAM device 37 are changed, the system particularly writes the changes to the transaction data storage device 451 rather than conventionally writes the contents of the RAM device 37 to the non-volatile memory device. In this way, the storage of the changes can be finished in a short time, resulting in a reduced probability that the storage of the changes is interrupted.

In addition, when the amount of data stored in the transaction data storage device 451 has reached a certain level, the provisioning data stored in the backup data storage device 453 can be updated according to the contents of the transaction data storage device 451. Take an example of changing parameters similar to the previous one. That is, the first, second, and third parameters stored in the backup data storage device 453 are changed from M to m from N to n, and from Q to q, respectively, according to the contents of the transaction data storage device 451. After the changes are completed, the provisioning data stored in the backup data storage device 453 are the latest version of provisioning data so that the contents of the transaction data storage device 451 may be cleared. After the system restarts, the system is configured according to the latest provisioning data read from the backup data storage device 453 so as to correspond to the user's actual requirements.

Moreover, even if the system is interrupted suddenly, the provisioning data stored in the backup data storage device 453 will not be affected. Because the system, as the parameters stored in the RAM device 37 are changed, only needs to write the changes to the transaction data storage device 451 rather than directly writes the changes to the backup data storage device 453, when system interruption occurs suddenly, the provisioning data stored in the backup data storage device 453 remains unchanged. In other words, the process of writing the changed parameters to the transaction data storage device 451 is independent of the backup data storage device 453, thus ensuring that the provisioning data stored in the backup data storage device 453 will not be damaged under such sudden situation. Thus, when the system restarts due to a contingent situation, the system need not be configured with the initial backup data, but with the parameters closely similar to the actual requirement, instead.

Embodiment II

Figure 5:
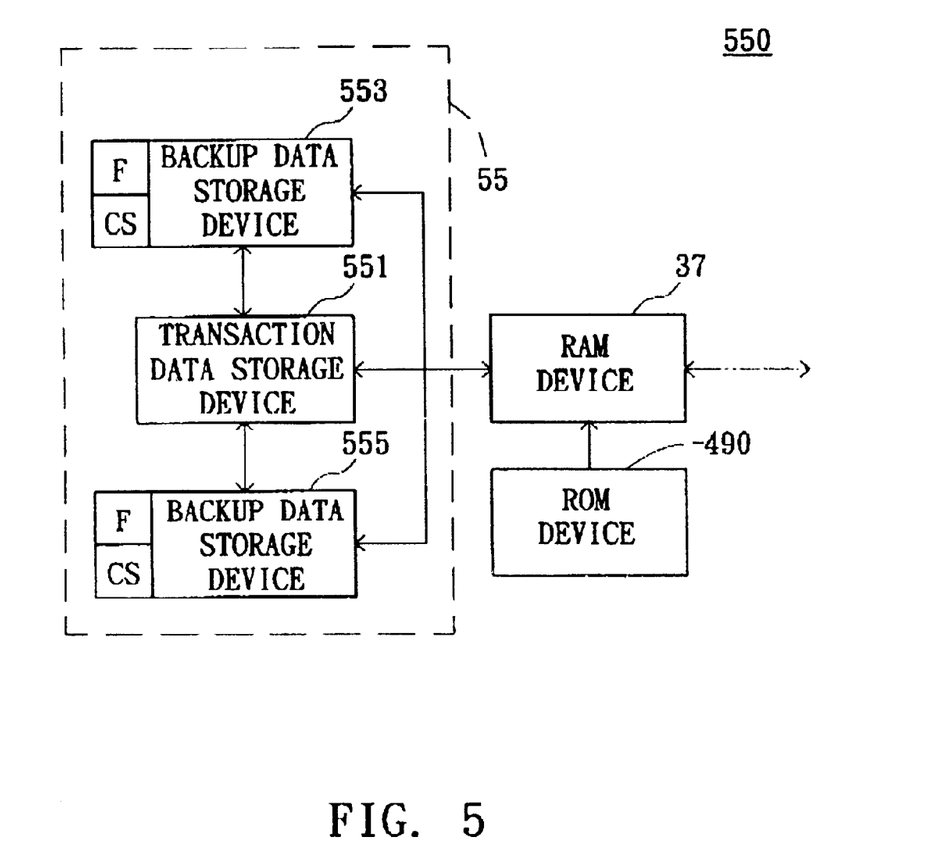
FIG. 5 is a block diagram illustrating a data storage device according to a second embodiment of the invention.

The non-volatile memory device including a transaction data storage device and a backup data storage device is disclosed in the first embodiment. In practice, the non-volatile memory device can include, for example, two backup data storage devices for storing two different versions of provisioning data. FIG. 5 shows a data storage device 550 in accordance with a second embodiment of the invention. The data storage device 550 includes a non-volatile memory device 55, a random access memory (RAM) device 37, and a read-only memory (ROM) device 490, wherein the non-volatile memory device 55 is coupled to the RAM device 37. The non-volatile memory device 55 includes a transaction data storage device 551, backup data storage devices 553 and 555. The non-volatile memory device 55 can be a non-volatile memory such as a flash EPROM, while the transaction data storage device 551, backup data storage devices 553 and 555 can be formed with separate memory areas having their respective memory addresses inside the non-volatile memory device 55. The transaction data storage device 551 is used for storing the changed parameters stored in the RAM device 37. The backup data storage devices 553 and 555 are used to store different versions of the provisioning data, while the ROM device 490 is for the storage of the initial backup data and the programs for configuring the system. Since the functionality of the ROM device 490, transaction data storage device 551, backup data storage devices 553 and 555 are similar to the corresponding ones described in the first embodiment, the details will not be described for the sake of brevity. In the following, the data processing is to be described with the structure of the data storage device 550.

According to the second embodiment, two backup data storage devices 553 and 555 are used to store two different versions of the provisioning data. When the system starts up, the data processing device first reads and checks the checksums CS of the two backup data storage devices 553 and 555 so as to perform system configuration. If the two backup data storage devices 553 and 555 have valid checksums CS, the latest version of the provisioning data stored in the backup data storage device 553 or 555 are read. If only one of the backup data storage devices 553 and 555 has a valid checksum CS, the provisioning data of the one with the valid checksum CS are read. If both the checksums CS of the two backup data storage devices 553 and 555 are invalid, the initial backup data are read from the ROM device 490. After the check of the checksums CS, an appropriate provisioning data are read for use in system configuration. In addition, when it needs to update the provisioning data stored in the backup data storage devices 553 and 555, the data processing device first selects the one storing an old version of the provisioning data from the backup data storage devices 553 and 555, and then updates the contents of the selected one with the latest version of the provisioning data. In the following, the above process will be described in detail.

In the first start-up of the data storage device 550, since both the checksums of the backup data storage devices 553 and 555 are invalid, the system reads the initial backup data from the ROM device 490 and writes the initial backup data to the RAM device 37 in order to complete configuration of system. Besides, the backup data storage devices 553 and 555 have respective flags F for serial number recording. After the initial backup data are written into the RAM device 37, the RAM device 37 writes the initial backup data into the backup data storage devices 553 and 555. Next, the flags F of the backup data storage devices 553 and 555 are set to 0 to indicate that the contents of the two backup data storage devices are identical to the initial backup data, and can be referred to as the zeroth version of the provisioning data. After the first start-up, an initializing procedure begins to execute. The initializing procedure is a procedure for updating the provisioning data when both the two backup data storage devices store the zeroth version of the provisioning data. The initializing procedure will be described in the following.

Since both the backup data storage devices 553 and 555, as the initializing procedure executes, store the zeroth version of the provisioning data, when the system restarts, either the backup data storage device 553 or 555 may be selected and the provisioning data read from the selected one are written to the RAM device 37. Once changes in the contents of the RAM device 37 are made, the system writes the changes to the transaction data storage device 551. As the system restarts, either the backup data storage device 553 or 555 may be selected and the provisioning data read from the selected one are written to the RAM device 37, and then the contents of the RAM device 37 are updated according to the contents of the transaction data storage device 551. As a result, the RAM device 37 keeps the latest version of the provisioning data, corresponding to the user's actual requirements. Note that when the transaction data storage device 551 has accumulated a certain amount of data, the system can select one of the backup data storage devices 553 and 555 and update the version of the provisioning data stored in the selected one. After that, the system updates the checksum CS of the selected one as well as its flag F, and clears or erases the contents of the transaction data storage device 551. An example of the above process is described as follows.

On updating the version of the provisioning data, because the contents of the two backup data storage devices are identical, the system can select either the backup data storage device 553 or 555, and updates the contents of the selected one. Suppose the system selects the backup data storage device 553. The provisioning data stored in the RAM device 37 are written to the backup data storage device 553, and are substituted for the zeroth version of the provisioning data previously stored in the backup data storage device 553, thereby completing the updating process. Once the version of the provisioning data is updated, the checksum CS of the backup data storage device 553 is to be generated according to the contents thereof. Since the RAM device 37 stores the latest parameters that the system uses, the backup data storage device 553, after being updated, stores the latest version of the provisioning data. Thus, the flag F of the backup data storage device 553 is set to, for example, 1, indicating that the backup data storage device 553 stores the first version of the provisioning data. In addition, the contents of the transaction data storage device 551 can be cleared (or erased) after the updating of the contents of the backup data storage device 553. After the contents of the transaction data storage device 551 are cleared, if the contents of the RAM device 37 are changed, the changes are written to the transaction data storage device 551, one after another. Accordingly, updating the contents of the backup data storage device 553 can be postponed until the transaction data storage device 551 is full or nearly full. When the transaction data storage device 551 is full, the backup data storage device 553 is updated with the contents of the transaction data storage device 551. By updating the version of the provisioning data in this way, the times of writing data to the non-volatile memory device, for example, formed by flash EPROM, is reduced, thus resulting in an increased lifetime of the flash EPROM.

When the system restarts, if both the checksums of the two backup data storage devices are valid, the flags of the two backup data storage devices are compared and the selection of the one that stores the newer version of the provisioning data is made between the two backup data storage devices by the comparison. The contents of the selected one are, then, written to the RAM device 37. Since the flags of the backup data storage devices 553 and 555, at that time, have values of 1 and 0, respectively, the provisioning data stored in the backup data storage device 553 are newer (in this example, the larger the value of a flag, the newer the version of the provisioning data stored in a backup data storage device). Thus, the system reads the contents of the backup data storage device 553, writes them to the RAM device 37, and then updates the contents of the RAM device 37 according to the contents of the transaction data storage device 551. Afterwards, when the transaction data storage device 551 has accumulated a certain amount of data, the system selects one from the backup data storage devices 553 and 555, and updates the version of the provisioning data stored in the selected one. After the updating of the provisioning data, a new checksum CS and flag F are generated for the selected one. Next, the system clears the contents of the transaction data storage device 551 so that the recording of modification to the provisioning data resumes. Note that since the contents of the two backup data storage devices are different, when the updating of the provisioning data is performed, the system selects the one storing the older version of the provisioning data from the two backup data storage devices, according to their flags, and then updates the contents of the selected one. Since the flag of the backup data storage device 553 is 1 while that of the backup data storage device 555 is 0, the backup data storage device 555 stores the older version of the provisioning data. Thus, the provisioning data stored in the RAM device 37 are all written to the backup data storage device 555 so as to overwrite the zeroth version of the provisioning data stored in the backup data storage device 555, thereby completing the updating process. After the provisioning data are updated, the flag F of the backup data storage device 555 is set to a larger number, for example, 2, indicating that the backup data storage device 555 stores the second version of the provisioning data.

In brief the version of the provisioning data is updated with the contents of the RAM device 37 to overwrite the version of the provisioning data stored in the backup data storage device that is selected from the two backup data storage devices according to their respective flags. As to the comparison between different versions in the second embodiment, the flag of a backup data storage device with a smaller value indicates an older version of the provisioning data is stored in the backup data storage device. With this criterion, the system can select the backup data storage device whose flag is a smaller value, from the two backup data storage devices, as the object to be updated. Having being updated, the selected backup data storage device has its flag set to a greater value. When the system restarts, on the other hand, the system selects the backup data storage device that has the greater flag value between the two backup data storage devices, and writes the contents of the one with the greater flag value to the RAM device. Since the flag with a greater value indicates a newer version of the provisioning data, the selected provisioning data can be more similar to that the user actually requires with this selection process. After the system loads the latest version of the provisioning data to the RAM device, the system modifies the contents of the RAM device according to the parameters stored in the transaction data storage device. Having being modified, the parameters stored in the RAM device correspond to the actual requirements of the user.

With the structure of the data storage device 550, if the system is exceptionally interrupted as the system performs the updating of the provisioning data on a backup data storage device, the checksum CS of such backup data storage device will be determined to be invalid when the system restarts. Nevertheless, correct provisioning data corresponding to a newer version are to be selected, regardless of the exceptional interruption of the system because the system is first to examine whether the checksums of the two backup data storage devices are valid when the system restarts. The following will describe the system starting process and updating process with flowcharts, for the sake of clarity.

Figure 6:
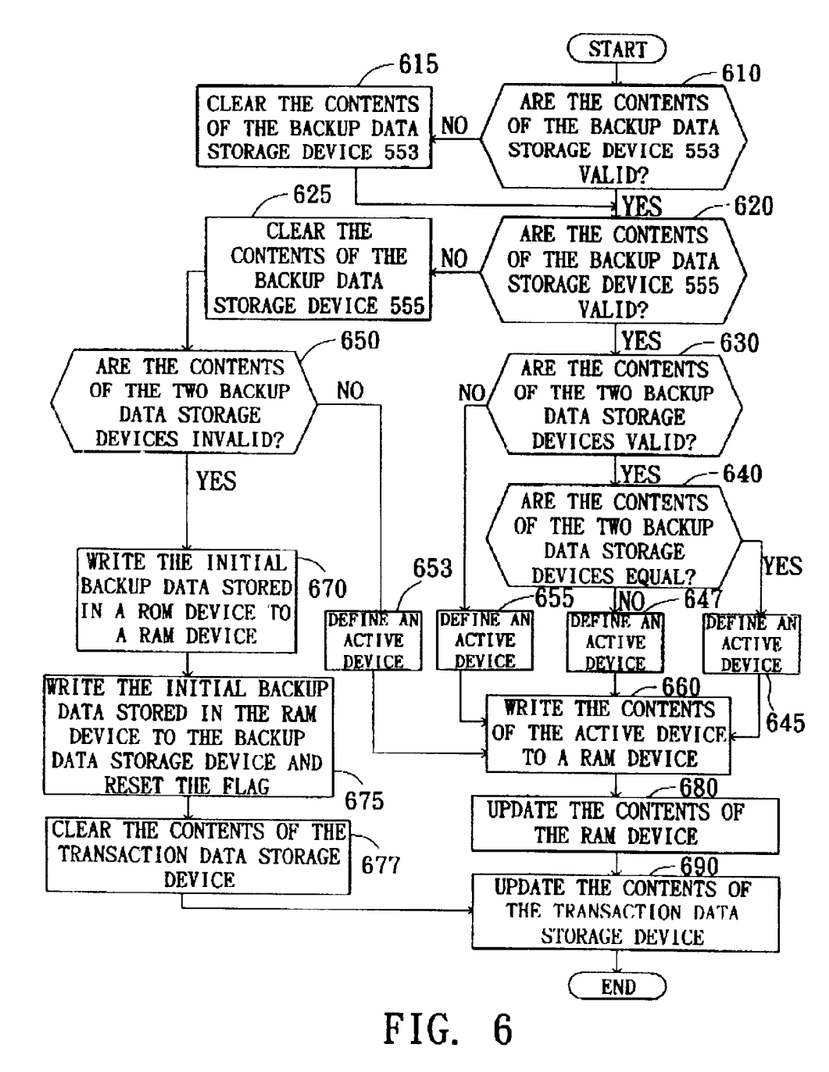
FIG. 6 is a flowchart illustrating a starting process for the system in the second embodiment.

FIG. 6 is a flowchart illustrating the system starting process in the second embodiment. After the system starts up, step 610 is first performed so as to determine whether the contents of the backup data storage device 553 are valid, for example, by calculating the checksum according to the contents and then comparing such checksum with the checksum CS stored in the backup data storage device 553. By the comparison, if they are equal, it indicates the contents of the backup data storage device 553 are valid, and the process goes to step 620 to check the contents of the backup data storage device 555. Otherwise, if the calculated checksum and the stored checksum CS are unequal, it indicates the contents of the backup data storage device 553 are invalid. In this case, either the flag and/or the contents of backup data storage device 553 should be cleared (or erased), as shown in step 615, and then the process goes to step 620 to check the contents of the backup data storage device 555. In step 620, a determination is made as to whether the contents of the backup data storage device 555 are valid, for example, by calculating the checksum according to the contents and then comparing the calculated checksum with the checksum CS stored in the backup data storage device 555. If the contents of the backup data storage device 555 are valid, the starting process proceeds to step 630 to determine whether the contents of the backup data storage devices are both valid. If the contents of the backup data storage device 555 are invalid, the flag and/or the contents of the backup data storage device 555 should be cleared (or erased) in step 625, and then the process goes to step 650. In step 650, a determination is made as to whether the contents of the backup data storage devices are both invalid. If not, it indicates that the contents of the backup data storage device 553 are valid while the contents of the backup data storage device 555 are invalid, and the backup data storage device 553 is defined as an active device, in step 653. If yes, it indicates the contents of them are both invalid, and the process goes to step 670.

In step 630, it is to determine whether the contents of the backup data storage devices are both valid. If yes, a determination is made, in step 640, as to whether the contents of the backup data storage devices are equal. If it is determined that they are equal the system can select the backup data storage device 553 or 555 and defines the selected one as an active device in step 645; in other words, either device can be defined as the active device in step 645. If it is determined that they are not equal in step 640, the backup data storage device which stores the newer version of the provisioning data is defined as an active device in step 647. In step 630, if it is determined that only one of them is valid, that is, only one of the backup data storage devices has valid contents, the one with valid contents is defined as an active device in step 655. Note that the active device is the one of the two backup data storage devices which stores the valid provisioning data corresponding to the newer version. After the active device is defined, the provisioning data stored in the active device are read and written to the RAM device 37 in step 660. After step 660, the RAM device 37 has its corresponding parameters updated according to the contents of the transaction data storage device 551, in step 680, resulting in the provisioning data of the RAM device 37 to correspond the user's actual requirements. After the system starts up, if the provisioning data are changed because the requirements of the user are changed, the system writes the changes in the provisioning data read from the RAM device 37 to the transaction data storage device 551, as indicated in step 690. In addition, when the system starts up, the contents of the RAM device 37 are updated according to the contents of the transaction data storage device 551.

In step 650, on the other hand, it is to determine whether the contents of the backup data storage devices are both invalid. If yes, the process goes to step 670. In order to cause the system to start up smoothly, in step 670, the initial backup data are copied from the ROM device to the RAM device 37 and are used for the starting process. Note that after the initial backup data are loaded into the RAM device, in step 675, the system reads the initial backup data from the RAM device, and writes them to the backup data storage device so as to overwrite the invalid contents of such backup data storage device, thus enabling at least one of the backup data storage devices to provide a valid copy of the initial backup data. In step 675, after the updating of the contents, the checksum of the backup data storage device can be calculated, based on the contents thereof, and its flag can be reset to zero to indicate the contents thereof are the zeroth version of the provisioning data. Hence, next time when the system starts up, parameters can be directly read from the backup data storage device to obtain the parameters for the starting process. After step 675, the process proceeds to step 677 to clear the contents of the transaction data storage device, and the system is configured according to the initial backup data stored in the RAM device 37, whereby the system can start up smoothly. Afterwards, if changes in the provisioning data occur because the user changes the requirements, the system will record the changes of the provisioning data on the transaction data storage device 551 in step 690. Thus, next time when the system starts up, the RAM device 37 can be updated with the contents of the transaction data storage device 551, as described previously. In the following, the updating process for the backup data storage device is described.

Figure 7:
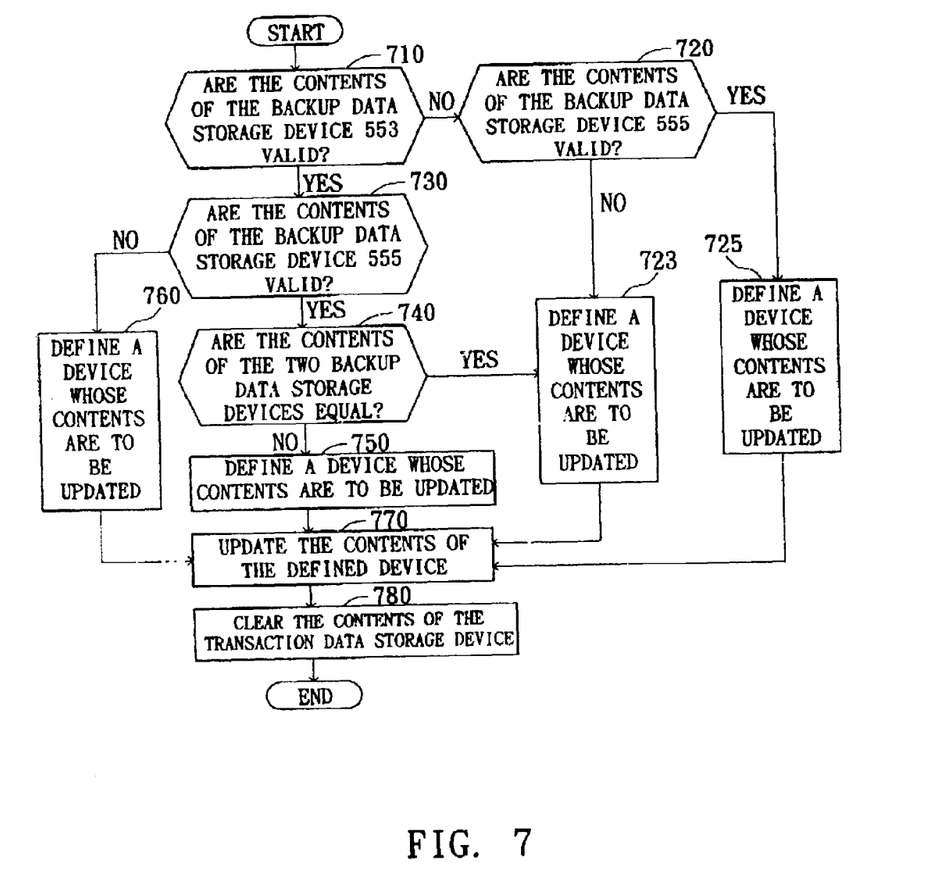
FIG. 7 is a flowchart illustrating an updating process for the system in the second embodiment.

In general, the process of updating the version of the provisioning data is performed on one of the two backup data storage devices that stores an older version of the provisioning data. If the contents of one of the two backup data storage devices are invalid, the updating process is performed on this one. If the contents of the two backup data storage devices are invalid, or identical, the updating process may be performed on either of them. The updating process of the second embodiment is illustrated in FIG. 7. In step 710, the system first determines whether the contents of the backup data storage device 553 are valid. If not, the system further determines whether the contents of the backup data storage device 555 are valid, in step 720. If it is determined that the contents of the backup data storage device 555 are not valid, it indicates the contents of the two backup data storage devices are both invalid, and either of them may be selected as a device whose contents are to be updated, in step 723. In step 720, if it is determined that the contents of the backup data storage device 555 are valid, the backup data storage device 553 can be defined as a device whose contents are to be updated, in step 725.

In step 710, if it is determined that the contents of the backup data storage device 553 are valid, the updating process proceeds to step 730 to determine whether the contents of the backup data storage device 555 are valid. If the contents of the backup data storage device 555 are valid, the updating process goes to step 740. In step 740, a determination is made as to whether the backup data storage devices 553 and 555 are identical in content. If so, it indicates that the two backup data storage devices are both valid and identical in content, and either of them can be selected as a device whose contents are to be updated, in step 723. If not, it indicates that the two backup data storage devices are both valid but are of different versions, and the one having an older version of the provisioning data is selected as a device whose contents are to be updated, in step 750. In step 730, if it is determined that the contents of the backup data storage device 555 are invalid, the backup data storage device 555 can be defined as a device whose contents are to be updated, as indicated in step 760.

After the device whose contents are to be updated is defined, the updating proceeds to step 770. In step 770, the contents of the RAM device are written to the defined device so as to replace the original contents of the defined device, and then the defined device stores the latest version of the provisioning data. At this time, the checksum can be calculated, based on the contents of the defined device, and the flag of the defined device is updated, thereby completing the updating process of the version of the provisioning data. After the updating process, in step 780, the contents of the transaction data storage device can be cleared (or erased).

According to the embodiments described above, the method of updating parametric data provides at least the advantages as follows.

1. If the system becomes abnormal, the system configuration can be set with the last version of the provisioning data as the system restarts, and thus the system can be avoided from returning to the configuration corresponding to the system default values.

2. The time for updating the data stored in the non-volatile memory device is reduced, thus resulting in a reduced probability of an updating process to be interrupted abnormally.

3. The number of times of updating the non-volatile memory device is reduced, thus resulting in an increased lifetime of the non-volatile memory device.

4. Since changed parameters are written to the transaction data storage device, one after another, the changed parameters stored in the transaction data storage device can be written to the backup data storage device, such as a flash memory device, when the contents of the flash memory is fill, thus resulting in a reduced number of times of updating the flash memory and an increased lifetime.

While the invention has been described by way of example and in terms of a preferred embodiment, it is to be understood that the invention is not limited thereto. On the contrary, it is intended to cover various changes and similar arrangements and procedures, and the scope of the appended claims therefore should be accorded the broadest interpretation so as to encompass all such changes and similar arrangements and procedures.

What is claimed is:

1. A method of updating data in a data management system, the data management system including a non-volatile memory device and a random access memory device, wherein the non-volatile memory device is coupled to the random access memory device and includes a transaction data storage device and a backup data storage device, the method comprising the steps of:

making changes in the contents of the random access memory device and writing the changes in the contents of the random access memory device to the transaction data storage device;

restarting the data management system;

copying the contents of the backup data storage device to the random access memory device and then updating the contents of the random access memory device according to the contents of the transaction data storage device; and updating the content of the backup data storage device according to the content of the transaction data storage device and clearing the contents of the transaction data storage device.

2. A method of updating provisioning data in a data management system, the data management system including a non-volatile memory device and a random access memory device, wherein the non-volatile memory device is coupled to the random access memory device, the non-volatile memory device includes a transaction data storage device, a first backup data storage device, and a second backup data storage device, and the first and second backup data storage devices have respective flags for serial number recording, the method comprising the steps of:

making changes in the contents of the random access memory device and writing the changes in the contents of the random access memory device to the transaction data storage device;

reading either the contents of the first backup data storage device or the contents of the second backup data storage device and writing the contents being read to the random access memory device, according to the flag for the first backup data storage device and the flag for the second backup data storage device, and then updating the contents of the random access memory device according to the contents of the transaction data storage device;

selecting a second one device from the first backup data storage device and the second backup data storage device, according to the flag for the first backup data storage device and the flag for the second backup data storage device; updating the contents of the second one device and setting the flag for the second one device, according to the contents of the random access memory device; and clearing the contents of the transaction data storage device; and restarting the data management device.

3. A method of updating provisioning data in a data management system, the data management system including a non-volatile memory device and a random access memory device, wherein the non-volatile memory device is coupled to the random access memory device, the non-volatile memory device includes a transaction data storage device, a first backup data storage device, and a second backup data storage device, and the first and second backup data storage devices have respective flags for serial number recording, the method comprising the steps of:

reading initial backup data from the random access memory device, writing the initial backup data to the first backup data storage device and the second backup data storage device, and setting the flags for the first and second backup data storage devices to identical serial numbers;

executing a starting process, the starting process comprising the steps of:

making changes in the contents of the random access memory device and writing the changes in the contents of the random access memory device to the transaction data storage device;

restarting the data management system; and selecting one device from the first backup data storage device and the second backup data storage device, reading the initial backup data from the one device, writing the initial backup data read from the one device to the random access memory device, and then updating the contents of the random access memory device according to the transaction data storage device;

selecting a first one device from the first backup data storage device and the second backup data storage device; updating the contents of the first one device and setting the flag for the first one device, according to the contents of the random access memory device; and clearing the contents of the transaction data storage device;

making changes in the contents of the random access memory device and writing the changes in the contents of the random access memory device to the transaction data storage device;

reading either the contents of the first backup data storage device or the contents of the second backup data storage device and writing the contents being read to the random access memory device, according to the flag for the first backup data storage device and the flag for the second backup data storage device, and then updating the contents of the random access memory device according to the contents of the transaction data storage device;

selecting a second one device from the first backup data storage device and the second backup data storage device, according to the flag for the first backup data storage device and the flag for the second backup data storage device; updating the contents of the second one device and setting the flag for the second one device, according to the contents of the random access memory device; and clearing the contents of the transaction data storage device; and restarting the data management device.

4. The method according to claim 3, wherein the data management system is an embedded system.

5. The method according to claim 3, wherein the data management system is an open system.

6. The method according to claim 3, wherein the transaction data storage device is an erasable programmable read-only memory (EPROM).

7. The method according to claim 3, wherein the transaction data storage device is an electrically erasable programmable read-only memory (EEPROM).

8. The method according to claim 3, wherein the transaction data storage device is a flash erasable programmable read-only memory (flash EPROM).

9. The method according to claim 3, wherein the first backup data storage device is an erasable programmable read-only memory (EPROM).

10. The method according to claim 3, wherein the first backup data storage device is an electrically erasable programmable read-only memory (EEPROM).

11. The method according to claim 3, wherein the fist backup data storage device is a flash erasable programmable read-only memory (flash EPROM).

12. The method according to claim 3, wherein the second backup data storage device is an erasable programmable read-only memory (EPROM).

13. The method according to claim 3, wherein the second backup data storage device is an electrically erasable programmable read-only memory (EEPROM).

14. The method according to claim 3, wherein the second backup data storage device is a flash erasable programmable read-only memory (flash EPROM).

15. A method of updating provisioning data in a data management system, the data management system including a data storage device, the data storage device including a non-volatile memory device and a random access memory device, wherein the non-volatile memory device is coupled to the random access memory device and includes a transaction data storage device and a backup data storage device, the method comprising the steps of:

a. reading the contents of the backup data storage device and writing the contents of the backup data storage device to the random access memory device; and b. reading the contents of the transaction data storage device and updating a portion of parameters stored in the random access memory device according to the contents of the transaction data storage device.

16. The method according to claim 15, further comprising the step of:

c. updating a portion of parameters stored in the backup data storage device according to the contents of the transaction data storage device and clearing the contents of the transaction data storage device.

17. The method according to claim 15, wherein the method, before said step a, further comprises the step of:

making changes in the contents of the random access memory device and writing the changes in the contents of the random access memory device to the transaction data storage device.

18. A method of updating provisioning data in a data management system, the data management system including a data storage device, the data storage device including a non-volatile memory device and a random access memory device, wherein the non-volatile memory device is coupled to the random access memory device, the non-volatile memory device includes a transaction data storage device, a first backup data storage device, and a second backup data storage device, and the first and second backup data storage devices have respective flags for serial number recording, the method comprising the steps of:

a. comparing the flags for the first and second backup data storage devices so as to determine which one of the flags for the first and second backup data storage devices has a newly updated serial number, reading the contents of one backup data storage device that has the flag having the newly updated serial number and writing the contents of the one backup data storage device that has the flag having the newly updated serial number to the random access memory device; and b. updating the contents of the random access memory device according to the transaction data storage device.

19. The method according to claim 18, wherein the method, after said step b, further comprises the step of:

c. comparing the flags for the first and second backup data storage devices so as to determine which one of the flags for the first and second backup data storage devices has a previously updated serial number, updating the contents of one backup data storage device that has the flag having the previously updated serial number according to the random access memory device, setting the flag for the one backup data storage device that has the flag having the previously updated serial number, and clearing the contents of the transaction data storage device.

20. The method according to claim 18, wherein the method, before said step a, further comprises the step of:

d. making changes in the contents of the random access memory device and writing the changes in the contents of the random access memory device to the transaction data storage device.

* * * * *